US008555305B2

(12) United States Patent
Weinblatt et al.

(10) Patent No.: US 8,555,305 B2
(45) Date of Patent: Oct. 8, 2013

(54) INCENTIVE REWARDS OBTAINABLE AUTOMATICALLY BY AN AUDIENCE TUNED TO A BROADCAST

(75) Inventors: Lee S. Weinblatt, Teaneck, NJ (US); Thomas Langer, Teaneck, NJ (US)

(73) Assignee: Winmore, Inc., Tenafly, NJ (US)

( * ) Notice: Subject to any disclaimer, the term of this patent is extended or adjusted under 35 U.S.C. 154(b) by 1251 days.

(21) Appl. No.: 10/391,907

(22) Filed: Mar. 19, 2003

(65) Prior Publication Data
US 2004/0031046 A1 Feb. 12, 2004

Related U.S. Application Data

(60) Provisional application No. 60/365,762, filed on Mar. 19, 2002.

(51) Int. Cl.
H04N 7/16 (2011.01)
G06Q 30/00 (2012.01)

(52) U.S. Cl.
USPC .............................. 725/23; 725/22; 705/14.1

(58) Field of Classification Search
USPC ................ 705/14.1, 14.12, 14.36; 725/22–23
See application file for complete search history.

(56) References Cited

U.S. PATENT DOCUMENTS 5,128,752 A * 7/1992 Von Kohorn ..................... 705/10
5,448,568 A * 9/1995 Delpuch et al. ............. 348/423.1
5,481,294 A * 1/1996 Thomas et al. ................... 725/20
5,646,675 A * 7/1997 Copriviza et al. ............... 725/22
5,794,210 A * 8/1998 Goldhaber et al. ............. 705/14
6,057,872 A   5/2000 Candelore
6,698,020 B1 * 2/2004 Zigmond et al. ................ 725/34
2002/0120930 A1 * 8/2002 Yona ................................ 725/34
2003/0172376 A1 * 9/2003 Coffin, III ....................... 725/22
2004/0009763 A1 * 1/2004 Stone et al. .................... 455/410
2004/0031046 A1 * 2/2004 Weinblatt et al. ............... 725/23
2004/0148634 A1 * 7/2004 Arsenault et al. ............... 725/89

FOREIGN PATENT DOCUMENTS

EP           1 278 380 A    1/2003
JP           2003-009127 A  1/2003
WO           WO 02/39340 A  5/2002

* cited by examiner

Primary Examiner — Nasser Goodarzi
Assistant Examiner — Fred Peng
(74) Attorney, Agent, or Firm — Cozen O'Connor

(57) ABSTRACT

Providing a reward as an incentive for a person to become an audience member of at least one program being performed by reproduction equipment. A programming signal used for broadcasting the program with a programming signal source is encoded with discrete code signals, such that a preset number of the code signals occur within a given period of time, to produce an output signal which is broadcast. The broadcast output signal is received, and the code signals therein are detected. The number of the code signals detected while the person is an audience member of the at least one program is compared with predetermined reward issuance criteria. A reward is issued when the reward issuance criteria are met by the number of detected code signals.

10 Claims, 3 Drawing Sheets

INCENTIVE REWARDS OBTAINABLE AUTOMATICALLY BY AN AUDIENCE TUNED TO A BROADCAST

RELATED APPLICATIONS

This application claims priority from U.S. Provisional Patent Application Ser. No. 60/365,762 which was filed on Mar. 19, 2002.

FIELD OF THE INVENTION

This invention is directed to a technique applied to an audience that is listening to and/or watching a program broadcast from a program signal source as it is being performed by reproduction equipment and, more particularly, to reward persons who meet certain reward issuance criteria when they have chosen to be members of that audience by tuning in to the program signal source which is offering the reward.

BACKGROUND OF THE INVENTION

The term "program" as used herein can be a commercial type (e.g. advertisement) and/or a non-commercial type (e.g. an entertainment show), and it involves a programming signal (e.g. a television signal) obtained from a program signal source (e.g. a television station), originated by a program provider (e.g. a television network, an advertiser, or a production company) and reproduced as audio and/or video. The "broadcast" of the program can be over the airwaves, cable, satellite, or any other signal transmission medium. An "audience" for such program reproduction is constituted of the persons who perceive the program.

The program is "performed" by any reproduction equipment which results in some form that is perceptible to human beings, the most common being video and audio. The "reproduction equipment" is any and all types of units to convert a broadcast signal into human perceptible form.

The audience can be described as being "tuned" to a specific program signal source, such as a TV or radio broadcast station. The word "tuned" is applied herein to all situations in which a person chooses to be an audience member of a program or programs being broadcast by that specific program signal source, such as by twisting a dial or operating a remote control device of a TV, for example, in order to set that TV so it can receive and perform the programs from that source.

The size of an audience can be important for any one of a number of reasons. For example, a TV show must have a minimum audience size in order to survive. It also affects advertising rates. TV and radio stations charge advertisers based on two variables, namely the number of people in the audience and the qualities of the viewers in the audience. Charges are based on a certain number of dollars per thousand viewers. It can cost an advertiser to broadcast a commercial on one TV show an amount several times what it would cost on another TV show. As regards the qualities of the audience, certain advertisers want to speak to young trendsetters, while other advertisers (e.g. drug companies) want to speak to older viewers or wealthier viewers (e.g. luxury car co.). To measure these audiences, national TV samples are taken daily in the seven largest U.S. cities for network shows only (approximately 4,000 to 5,000 homes are included in this sample). Paper and pencil diaries are used four times a year during 3-4-week measurement periods to measure the viewing habits in the 250 other large viewing markets. These four measurement periods are called "sweep weeks", or "sweeps". During this period of time, network and local stations make every attempt to boost their ratings. Prime movies are shown, plots for sitcoms are selected which are of maximum interest, and even newscasts carry special features. Another situation when it is valuable to entice viewers is when a programming change occurs, such as when the new season starts, when a replacement show is introduced or a change in the broadcast time of a program is made. If a show does not attract viewers within the first three weeks, it has to give refunds for lower audience counts to those advertisers that had commercials broadcast during that initial period. Therefore, audience size is important, for example, to producers of TV shows, to advertisers, and to the TV stations and networks who profit from the shows and the commercials.

The incentive for a person to watch, for example, a particular network TV show and thus become a member of its audience is, of course, that person's level of interest in the TV show in relation to the attractions of competing interests. Competing for that person's viewership are the other network TV shows then being broadcast, other forms of entertainment available in the house, such as cable TV and live radio programs, recorded audio/video programs, various types of entertainment available outside of the house, and of course a host of other activities. Program providers would find it advantageous to have some incentive, other than the program itself, for attracting a person away from all those competing entertainment and non-entertainment activities to tune into a specific program and thereby increase its audience size.

It would also be advantageous for the program provider to have an incentive that could keep the person from switching away from the program. Switching by the audience is undesirable because it reduces the person's exposure not only to the TV show but also to its commercials.

One type of incentive that is in wide usage for various purposes is to provide discount coupons for the purchase of products or services. For reasons of brevity and convenience, the ensuing discussion related to the present invention will refer to the incentives it provides as discount coupons or reward coupons, or just "rewards" for short.

When a reward is offered in exchange for some action by a person, the person's level of interest in obtaining the reward is proportional to the amount of time between the action and getting the reward. The highest level of interest is achieved when the reward is given promptly after the action.

Such a reward should have a number of characteristics. In particular, it should be made available at no inconvenience to the audience member, and it should be provided promptly (preferably immediately) after the person has met the requirements for getting the reward. It should be in a form that is convenient for the person to use for redeeming the reward, and it must have adequate value. It should also be easily controllable and modifiable by the program provider to be issued only when certain criteria are met.

No technique for issuing such rewards is available in the prior art despite the need for it.

SUMMARY OF THE INVENTION

One object of the present invention is to provide an incentive reward for persons to tune to a program signal source.

Another object of the present invention is to issue such a reward automatically when certain reward issuance criteria are met.

A further object of the present invention is to issue such a reward promptly when certain reward issuance criteria are met.

Yet another object of the present invention is to issue such a reward in a form that is convenient for the person to redeem, and it must have adequate value.

One other object of the present invention is to have the issuance criteria be easily settable, controllable, and/or modifiable.

These and other objects are attained in accordance with one aspect of the invention directed to providing a reward as an incentive for a person to become an audience member of at least one program being performed by reproduction equipment. A programming signal used for broadcasting the program with a programming signal source is encoded with discrete code signals, such that a preset number of the code signals occur within a given period of time, to produce an output signal which is broadcast. The broadcast output signal is received, and the code signals therein are detected. The number of the code signals detected while the person is an audience member of the at least one program is compared with predetermined reward issuance criteria. A reward is issued when the reward issuance criteria are met by the number of detected code signals.

Another aspect of the invention directed to generating a broadcast output signal for use in providing a reward as an incentive for a person to become an audience member of at least one program being performed by reproduction equipment receiving the broadcast output signal. A programming signal is derived that corresponds to the at least one program for which incentive rewards are to be made available. At least one time interval is designated within the at least one program during which the incentive is to apply. The programming signal is encoded with discrete code signals, such that a preset number of the code signals occur within a given period of time, to produce an output signal, and the output signal is broadcast.

DETAILED DESCRIPTION OF THE DRAWINGS

Figure 1:
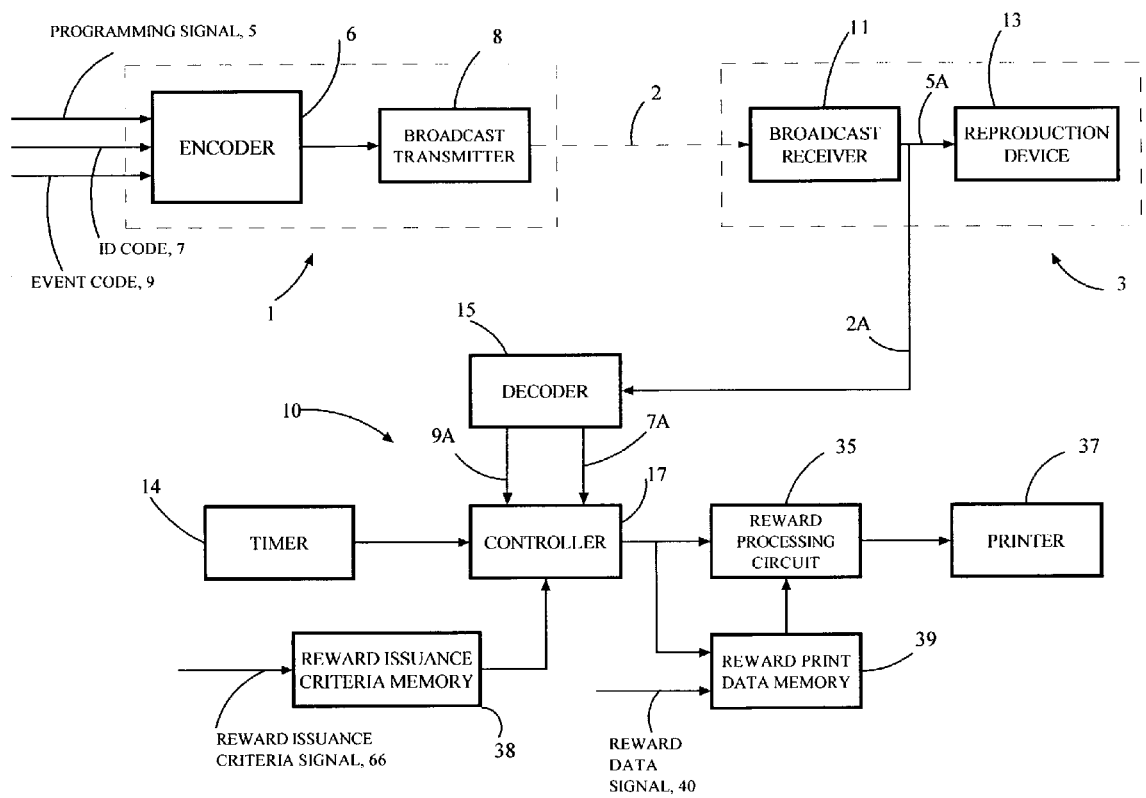
FIG. 1 is a schematic block diagram for explaining the invention.

The present invention relies on the following key components. As shown in FIG. 1, a program signal source 1, such as a television ("TV") broadcast station, generates a broadcast output signal 2 which is a combination of a programming signal 5, an identification ("ID") code signal 7 and an event code signal 9. The ID code can be uniquely assigned to a local TV station or to a national TV network. The event code can be uniquely assigned to a specific program. One or the other code can be used, or even both together, as explained below. ID code 7 and/or event code 9 are provided along with the programming signal 5 in order to enable printing a reward coupon automatically upon certain criteria being met in connection with, for example, being tuned to the program signal source which is offering the rewards. Thus, the conventional programming signal 5 is encoded by encoder 6 with codes 7 and/or 9. The term "encoded" is used in the broadest sense to include any and all techniques for combining a programming signal with other signals for broadcasting them together by a well known, commonly used broadcast transmitter 8.

Signal 2 is received by program reproduction apparatus 3 which is capable of performing the programming signal, such as in video and/or audio, at a site of an audience member, such as in the home. The reproduction apparatus 3 also provides a signal 2A, related to signal 2, as an input to reward output apparatus 10 which is automatically actuated, when certain audience-related reward issuance criteria are met, to print a reward on a printer 37 located at the site of such audience member.

The specific broadcasting and encoding techniques chosen depend on various design considerations. The code signals can be either analog or digital. The encoding, transmission, detection and decoding of such data signals are conventional and readily apparent to anyone with ordinary skill in the art. Such specifics do not form a part of the present invention. Details thereof would add unnecessarily to the length and complexity of this description. Consequently, such details are not provided herein.

Broadcast receiver 11 of apparatus 3 processes the received programming signal 5 and inputs it, as signal 5A, to reproduction device 13. Thus, if apparatus 3 is a TV set, receiver 11 could be a tuner, and device 13 is the TV screen and its related circuitry and components.

The output signal 2A of receiver 11, which can contain ID code signal 7 and event code signal 9, is provided to decoder 15. Decoder 15 includes circuitry to extract a signal containing the programming signal 5 and/or the code signals 7, 9 from signal 2A. Such circuitry is well known, and thus details thereof are not needed herein. Decoder 15 determines whether its input has received a code signal and, if so, it outputs signals 7A and 9A, corresponding to each of the code signals, to controller 17. Signals 7A and 9A can be respectively identical to the code signals 7 and 9 obtained from broadcast signal 2 via receiver 11, or they can be a minimally changed version thereof (e.g., amplified), or they can be a substantially changed version, depending on the specific signals and the encoding/decoding technique chosen and based on well known design considerations.

Controller 17 can be a suitable microprocessor chip that is programmed to implement a sequence of operations for recognizing when certain tuning criteria have been met and, if so, to trigger reward processing circuit 35 into retrieving reward printing data from memory 39 for use in printing a reward on printer 37. Operational details of controller 17 are provided below.

Apparatus 3 is a conventional part of a commercially available video and/or audio instrument, such as a TV set. Apparatus 10 could be embodied as a separate box that houses all of its components. Only minimal retrofitting of the TV, for example, would be required in order to implement the invention, such as connecting the broadcast receiver 11 (e.g. TV tuner) to the decoder 15. The connection to the TV set could be with a direct line or by remote signal transmission (e.g. RF, infrared, sonic). Other than that, the installation of the box housing apparatus 10 is very simple in that it just needs to be plugged into a wall outlet socket to receive power. Only a one time, fast, simple installation is involved that requires no retrofit of other apparatus in the house.

Alternatively, apparatus 10 could have its circuitry incorporated into the electronics of the TV. For example, the electronics could be fabricated on the semiconductor chip used to control operation of a TV and the viewing of programs on it. Such TV chips are becoming increasingly sophisticated with modern TVs being provided with added functionality approaching that of a computer. The cost of adding such circuitry to a TV chip is minimal considering the large number of chips over which the cost would be spread.

Turning now to a more detailed explanation of the present invention, encoder 6 controls the necessary control circuitry for combining programming signal 6 with ID code 7 and/or event code 9 in accordance with settable parameters. As shown in the flow chart of FIG. 2, encoder 6 can be used to set the ID code transmission parameters, per operation 50, and also to set the event code transmission parameters, per operation 52. The transmission parameters for both codes are highly dependent on the reward issuance criteria that, when met by the audience, will result in the issuance of a reward. Consequently, it is difficult to discuss these transmission parameters in general terms. A more meaningful explanation can be given by providing specific examples. Thus, if the event for which a reward is intended to be an incentive is a specific TV show, then a reward will be made available if a TV set is tuned to that show for a duration of time sufficient to detect a preset number of event codes. Such event codes can be spread evenly through the duration of the program, they can be skewed toward its beginning or skewed toward its end. Let us take each of these options as a possibility to be examined in further detail.

Figure 2:
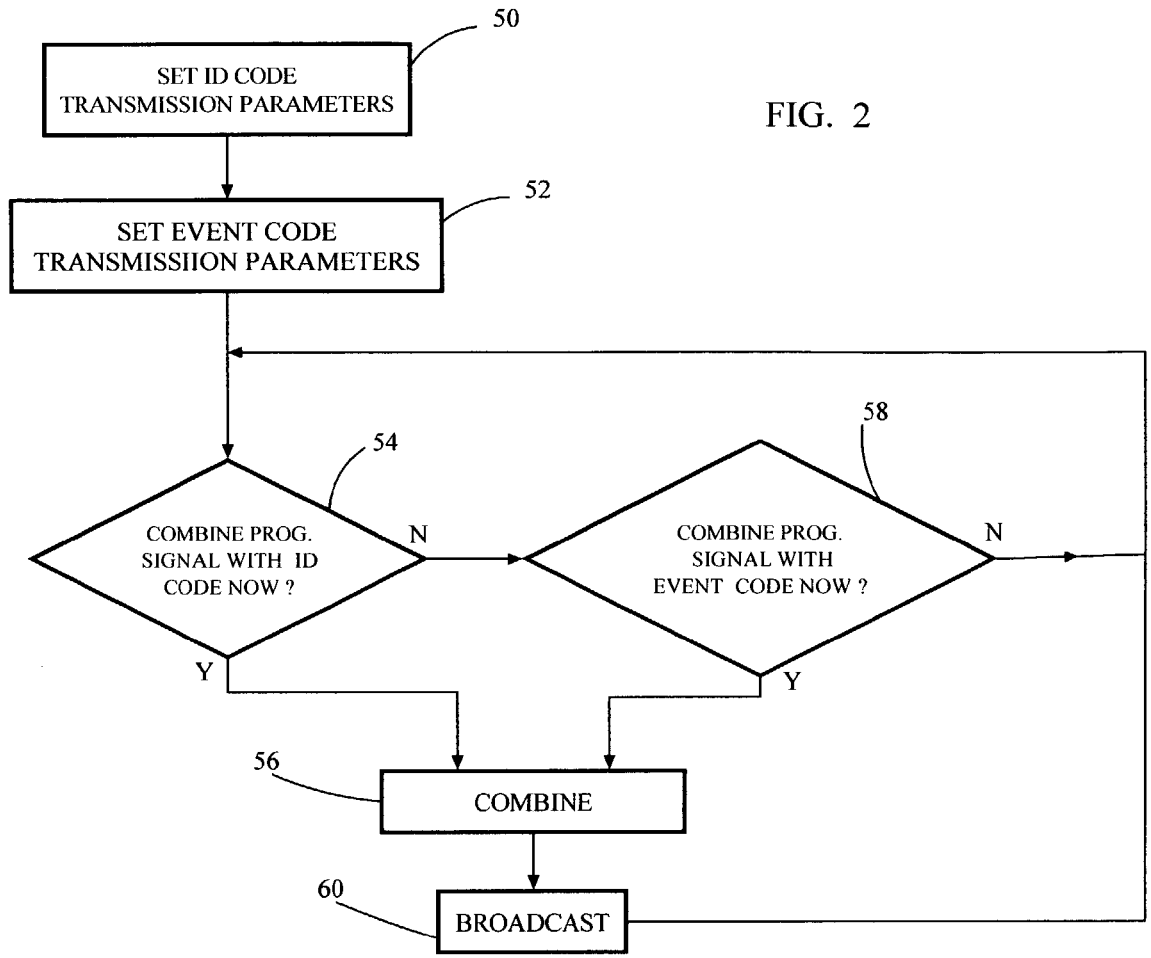
FIG. 2 is a flow chart showing operations performed by the program signal source for transmitting a broadcast signal in accordance with the invention.

If the event codes are to be transmitted at evenly spaced intervals throughout the entire program, then the number of times that the event code is transmitted by programming signal source 1 can be simply calculated by dividing the duration of the program by the number of codes that are to be detected at the reception end. Thus, the event code parameters handled by operation 52 in FIG. 2 are: the unique event code itself, the time interval during which the event codes are to be transmitted, such as the date and the time range, and the calculated time spacing between event code transmissions. If, however, the code transmissions are to be skewed toward the beginning of the program, then the unique event code remains the same, of course, but the time interval and/or the spacing between code transmissions may be different. The skewing of the code transmissions toward the end of the program is similarly handled.

It is also possible to randomize the event code transmissions as to when they occur during a preset time interval, and given a preset number of desired event code transmissions rather than the time spacing therebetween. In fact, operation 52 can involve input of the number of desired code transmissions, and this data will be used together with a pre-stored equation for determining the transmission times. Application of the equation would determine whether the code transmissions are equally spaced, unequally spaced, or randomized.

Setting the ID code transmission parameters has somewhat different considerations. For example, one application for using the ID codes occurs when networks conduct their "sweeps" period. As is well known, the networks want to attract as many viewers to their shows as possible, either during the entire period of the "sweeps" or for particular programs. If, for example, the object is to attract as many viewers as possible during a particular day, then the time interval parameter is set for that day. This would be coupled with promotions to advertise that rewards are being offered and informing the public of the criteria that must be met. Once a preset number of detected ID codes is counted within the preset time interval, a reward will be issued regardless of when during the day those ID codes were detected. Alternatively, if the network desires to attract an audience only to particular programs during the day, such as for specific TV shows, then the ID codes will be set for broadcast only during those particular time slots corresponding to those programs. Moreover, as explained below, the reward issuance criteria will be set so that a minimum number of ID codes is detected in each one of the time slots corresponding to the shows of interest. Thus, the ID code transmission parameters include the following: unique ID code, time interval or intervals for the code transmissions, the number of codes to be transmitted during each interval, and so on.

Returning now to FIG. 2, encoder 6 will determine, per operation 54, whether the instant of time during which the operation is being performed is one during which the programming signal 5 is to be combined with ID code 7 based on the ID code transmission parameters set by 50. If it is such a time, then the two signals are combined, per operation 56. However, if operation 54 produces a negative result, then the flow proceeds to operation 58 to determine whether the programming signal 5 is to be combined with an event code 9 based on transmission parameters set by 50. If it is such a time, then the signals are combined by operation 56. Operation 56 is also capable of combining all three signals together for broadcast. The combined signal is broadcast, per operation 60. If operation 58 produces a negative result, then the flow returns to the input of operation 54. Also, after the combined signal is broadcast by operation 60, the flow returns to the input of operation 54.

Broadcast output signal 2 is, thus, generated in accordance with the flow chart shown in FIG. 2. Once that output signal is received by reproduction operation 3, the key aspect at this point of the description of this invention is that it is outputted as signal 2A which is provided to decoder 15 (FIG. 1). Signal 2A can be the same as received signal 2, or it can be a slightly modified version thereof, such as due to amplification or digital processing. It must, however, preserve codes 7 and 9.

Figure 3:
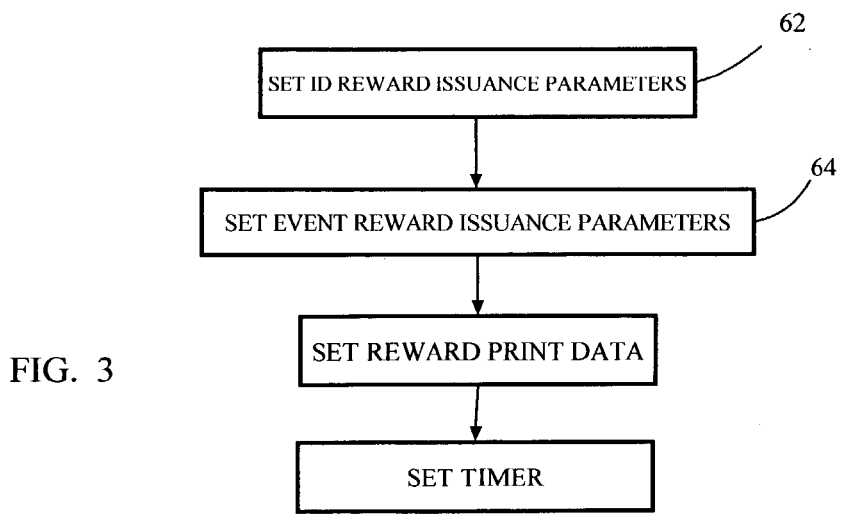
FIG. 3 is a flow chart for setting parameters to control the issuance of rewards.

Before proceeding to a detailed description of reward output apparatus 10, a discussion of the reward issuance criteria will be presented in connection with FIG. 3. The parameters for the reward issuance criteria are stored in memory 38. More specifically, the ID reward issuance parameters are set, per operation 62. For the specific example presented above in connection with the network "sweeps", let us say that the network wants to provide an incentive for a viewer to tune into the network throughout the entire day. Let us also say that the ID code transmission parameters have been set, per operation 50 described above, to transmit five ID codes per hour. Thus, for someone who is expected to have the TV set on for much of the day, the ID reward issuance parameter could be set to require the detection of 30 ID codes, which is equivalent to a minimum of five hours of viewing. Of course, since the ID code is being transmitted throughout the entire day, not only during those five hours, it is conceivable that the viewer was watching for ten hours, watched several programs in their entirety but others only partially, and would still be entitled to receive a reward based on the total count of ID codes.

However, merely monitoring the total number of detected ID codes would not suit the network if it were trying to entice viewers to watch specific programs. Consequently, for that type of an example, if 20 ID codes are transmitted during each program, and two specific programs are of interest to the network for building up their audience size, then the ID reward issuance parameters can simply be the detection of forty ID codes. Of course, the ID codes are transmitted only during those program time slots. However, if the network is willing to be somewhat flexible and allow people to switch programs for a slight period of time and yet still be eligible for a reward, then perhaps a total of only thirty ID codes would be sufficient to trigger the issuance of a reward. However, the network might require that at least 15 of those occur during each program. Thus, the ID reward issuance parameters would include both a total number for both programs as well as a minimum number that must be exceeded for each program.

The event reward issuance parameters are set, per operation 64. These parameters set the minimum number of event codes that must be detected during a program of interest.

The ID reward issuance parameters and event reward issuance parameters are stored in memory 38, per operations 62 and 64. Operations 62 and 64 can be carried out as a one-time, preset, fixed data storage. Alternatively, memory 38 can be of the rewriteable type to which a reward issuance criteria signal 66 is input. Signal 66 can be provided by its own dedicated transmission medium, such as a telephone line to device 10 provided for this purpose. Alternatively, signal 66 can be transmitted in combination with programming signal 5, in the same way as codes 7 and 9 are combined therewith. This could occur once per day or as needed.

In order to issue the rewards, such as by printing, reward print data memory 39 holds the necessary reward output data which includes all of the data specific to the particular reward that is required in order to print it. Such data includes, for example, the text, font, graphics, formatting, symbols, background color, font color, and so on. Alternatively, this data can be included in a reward data signal which is combined with programming signal 5 and transmitted along with the programming signal as part of output signal 2, as disclosed in U.S. application Ser. No. 10/080,949, filed Feb. 20, 2002. A variation of this approach is to pre-store some of this data in memory 39.

Timer 14 is provided to enable apparatus 10 to carry out its time-related activities. Timer 14 is typically an accurate clock. Preferably, it should not be accessible for setting by the audience because this could lead to fraudulent issuance of rewards which depends on preset time intervals, as explained in more detail below.

Figure 4:
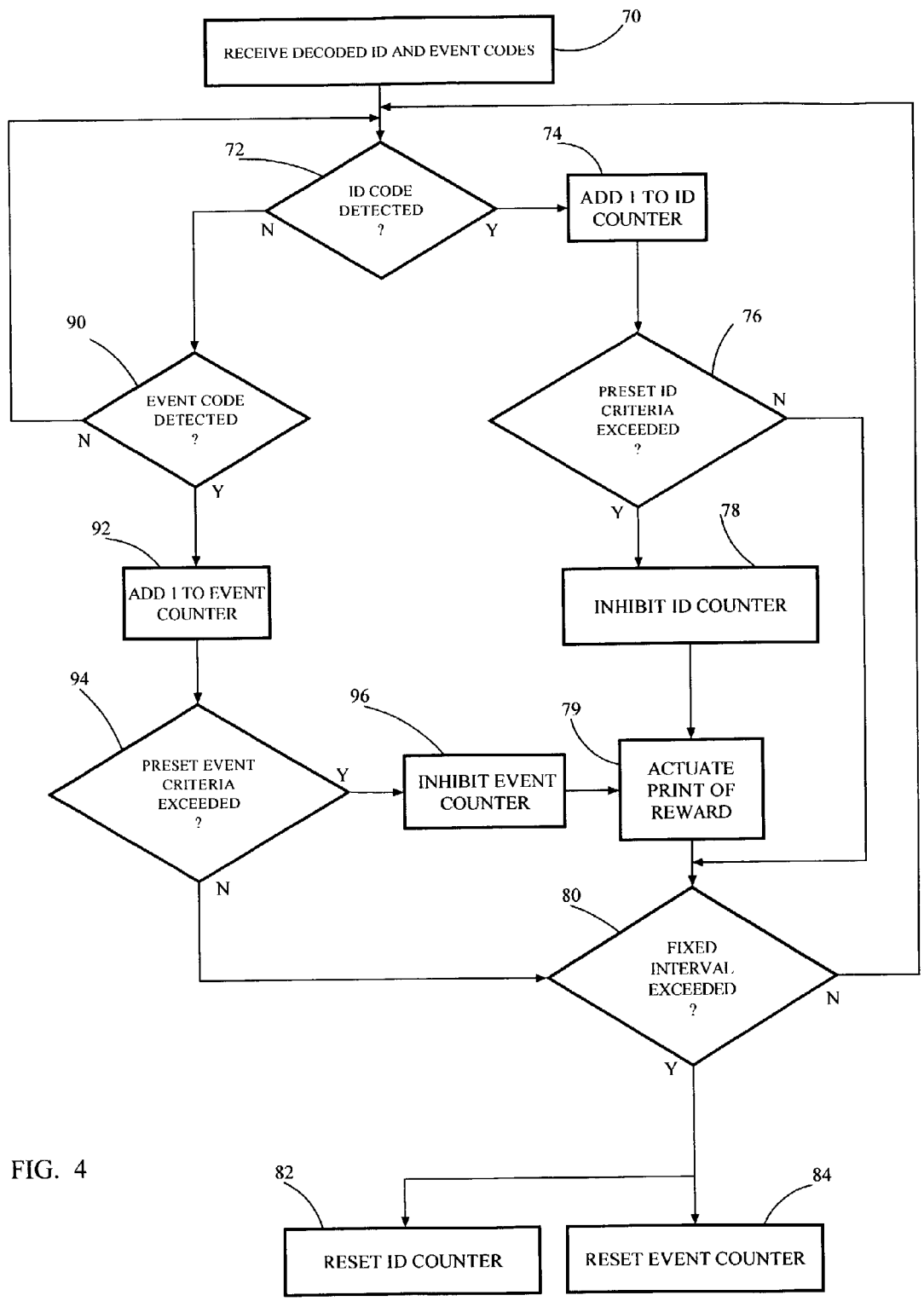
FIG. 4 is a flow chart for operations performed by the controller of FIG. 1.

Returning to FIG. 1, controller 17 preferably includes counters for determining how many ID codes and how many event codes have been decoded by decoder 15 and input to control 17 as signals 7A, 9A. As shown in FIG. 4, the decoded signals 7A, 9A are inputted by controller 17, per operation 70. Operation 72 determines whether an ID code 7A has been detected. If it has, then operation 74 adds 1 to the count that is already held in the ID counter of controller 17. Controller 17 then determines, per operation 76, whether the preset number of ID codes that is stored as an ID reward issuance parameter has been exceeded. If it has, further operation of the ID counter is inhibited, per operation 78. Otherwise, another ID reward would be printed each time that an additional ID code is detected. Then, the ID reward is printed, per operation 79. However, if operation 76 produces a negative result, then the flow proceeds to operation 80 to determine whether the fixed interval set in correspondence with the particular type of program for which the incentive is being provided has been exceeded. If the interval has been exceeded, then the ID counter is reset per operation 82 and, likewise, the event counter is reset per operation 84, so that the next interval begins with a count of zero, and to remove the inhibit signal if one has been generated. However, if the interval has not been exceeded then the flow returns to the input of operation 72.

If the result produced by operation 72 is negative in that an ID code has not been detected, then the flow proceeds to operation 90 to determine whether an event code has been detected. If not, then the flow simply returns to the input of operation 72. However, if an event code has been detected, then a 1 is added to the existing count in the event counter, per operation 92. Then, operation 94 checks to determine whether the preset number for the event codes has been exceeded. If it has, then further operation of the event counter is inhibited, per operation 96, and a print of the reward is made promptly and automatically, per operation 79. Moreover, operation 80 is once again accessed to determine whether the interval has been exceeded. If operation 94 produces a negative result, operation 80 is likewise accessed.

When controller 17 determines that a reward is to be issued, per operations 78 and/or 96, operation 79 produces a signal which is inputted to reward processing circuit 35 and reward print data memory 39 (FIG. 1). Reward processing circuit 35 utilizes the data retrieved from memory 39 to print the appropriate reward via printer 37, as explained above.

Although specific embodiments of the present invention have been described in detail above, various modifications thereof will readily occur to anyone with ordinary skill in the art. For example, different rewards can be provided for exceeding the criteria for each of the event code and the ID code. Likewise, different rewards can be issued relative to the length of the total viewing period, based on the number of detected codes. The more codes that are detected, the more valuable is the reward. Also, a different interval in terms of length, date and/or time can be provided for the detection of the event code and the ID code. In addition, rather than making only a single reward available, multiple rewards can also be provided for the detection of a preset number of the event code and/or the ID code. Thus, rather than inhibiting further counting, per operations 78 and 96, provision would be made to begin counting once again from zero immediately after a reward has been issued, even if that occurs within the assigned time interval. Also, the reward can be issued other than by printing. For example, rather than printing the reward as a coupon made of paper and ink, the reward data can be outputted to a portable electronic storage device, such as a smartcard. The smartcard could be inserted into a reader at a merchant's shop designed to read the reward data and enable redemption without the necessity to use paper and ink. Other possible variations include combining memories 38 and 39. Furthermore, the sequence of steps in the flow charts depicted in the drawings can be modified with equivalent results.

It is also feasible to enable the entry of reward data signal 40 into memory 39 from a remote station (not shown), as via a suitable wire or wireless communications link (e.g. a telephone line, ISDN line or cable, for example, or a wireless communication system can be used, such as satellite or cellular). This remote entry can be used, for example, to conveniently load new pre-stored formats into memory 39. It should also be understood and appreciated that it is not essential to rely on both ID and event codes. Only one of these audience monitoring codes is needed. Thus, if only event codes are used, then total viewing time can be derived by summing all of the detected event codes. Of course, this means that every program, or at least most of them, would have to be transmitted with an event code. Likewise, if only ID codes are used, they would be combined with a time stamp, such as from timer 14, to enable associating a particular ID code with a particular program.

These and all other such modifications are intended to fall within the scope of the present invention as defined by the following claims.

We claim:

1. A method for providing a reward as an incentive for a person to become an audience member of at least one program being performed by reproduction equipment, comprising:

providing a programming signal for broadcasting the program with a programming signal source;

encoding said programming signal with discrete code signals, such that a preset number of said code signals occur within a given period of time, to produce an output signal, wherein each of said discrete code signals identifies at least one of a broadcast source and a program;

broadcasting the output signal;

receiving the broadcast output signal and detecting the code signals therein;

determining the number of occurrences of said discrete code signals detected while the person is an audience member of the at least one program as an indication of a time duration;

comparing the indication of a time duration that is based on the number of occurrences of said detected discrete code signals with predetermined time-based reward issuance criteria; and issuing a reward when the time-based reward issuance criteria are met by the indication of a time duration that is based on the number of occurrences of said detected discrete code signals.

2. The method of claim 1, wherein the reward issuance criteria are related to being an audience member of a particular program.

3. The method of claim 1, wherein the reward issuance criteria are related to being an audience member tuned to a particular program signal source.

4. The method claim 1, wherein said reward is issued to the audience member promptly upon said issuance criteria being met.

5. The method of claim 4, wherein said reward is a discount coupon printed at said audience member's location.

6. The method of claim 1, wherein said reward is issued to the audience member automatically upon said issuance criteria being met.

7. The method claim 1, wherein said plurality of discrete code signals are equally spaced within said given period of time.

8. The method claim 1, wherein said reward issuance criteria include a threshold period of time as reflected by the occurrence of at least a specified number of detected code signals.

9. The method claim 1, wherein said reward issuance criteria are selectively adjustable.

10. An apparatus for providing a reward as an incentive for a person to become an audience member of at least one program being performed by reproduction equipment, comprising:

means for providing a programming signal for broadcasting the program with a programming signal source;

means for encoding said programming signal with discrete code signals, such that a preset number of said code signals occur within a given period of time, to produce an output signal, wherein each of said discrete code signals identifies at least one of a broadcast source and a program;

means for broadcasting the output signal;

means for receiving the broadcast output signal and detecting the code signals therein;

means for determining the number of occurrences of said discrete code signals received while the person is an audience member of the at least one program as an indication of a time duration;

means for comparing the indication of a time duration that is based on the number of occurrences of said detected discrete code signals with predetermined time-based reward issuance criteria; and means for issuing a reward when the time-based reward issuance criteria are met by the indication of a time duration that is based on the number of occurrences of said detected discrete code signals.

* * * * *